March 16, 1937.  F. A. TRUESDELL  2,074,155
SELF ADJUSTING VALVE TAPPET
Filed Aug. 9, 1934   3 Sheets-Sheet 1
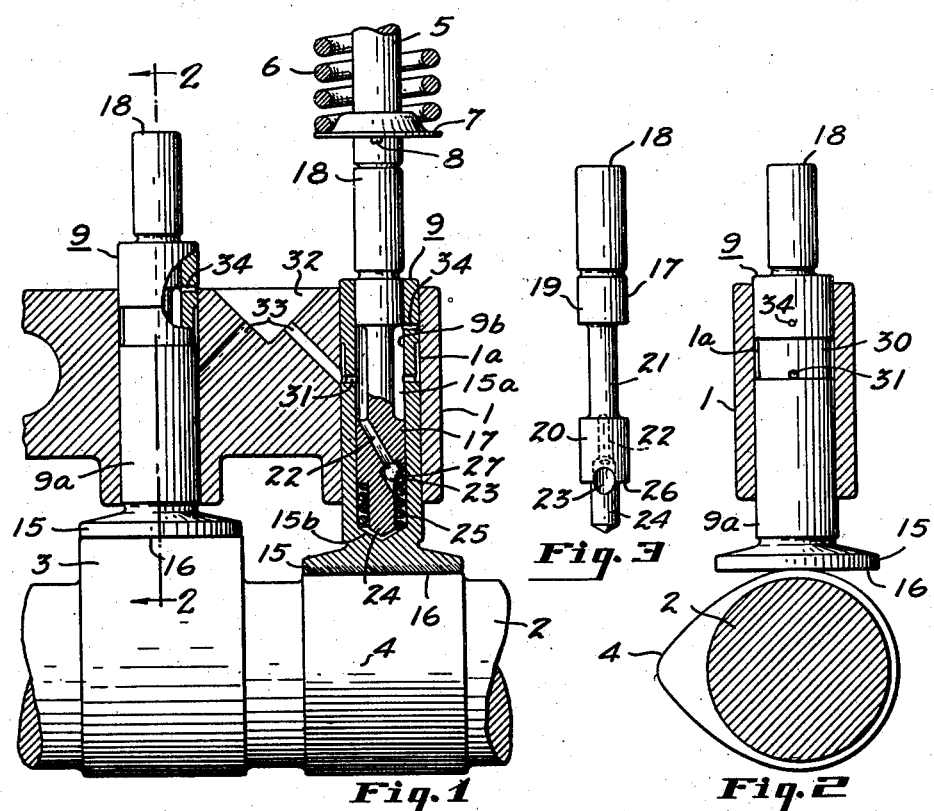
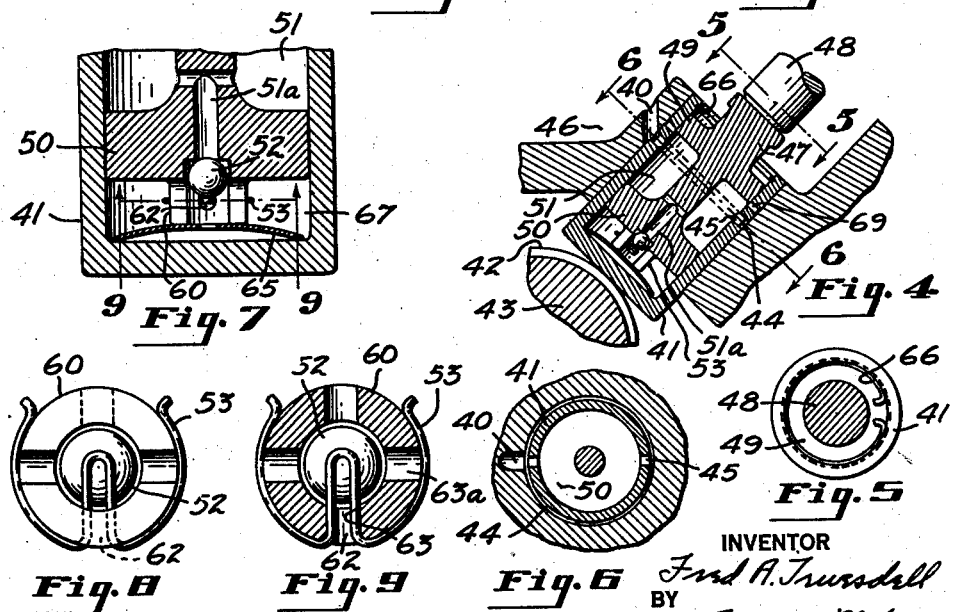
INVENTOR
Fred A. Truesdell
BY Evans & McCoy
ATTORNEYS

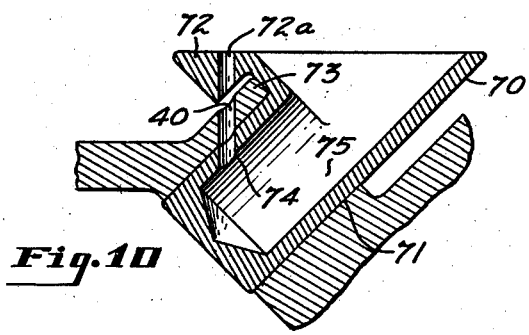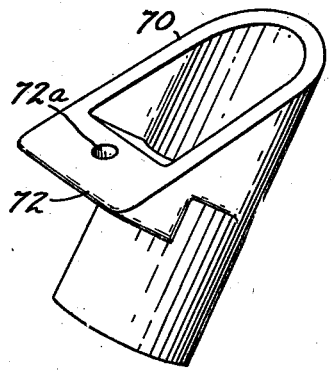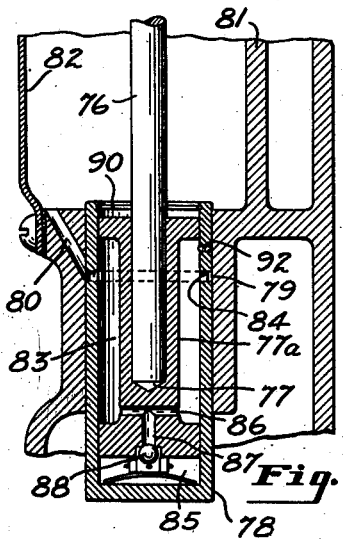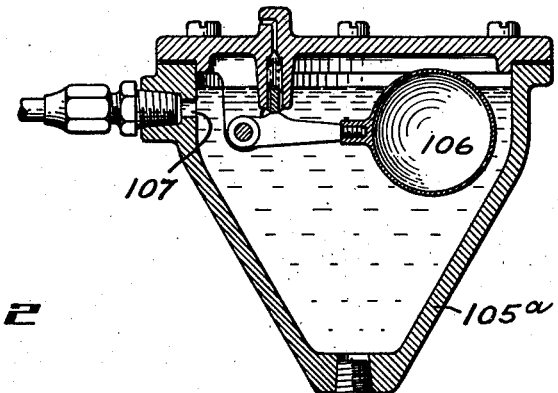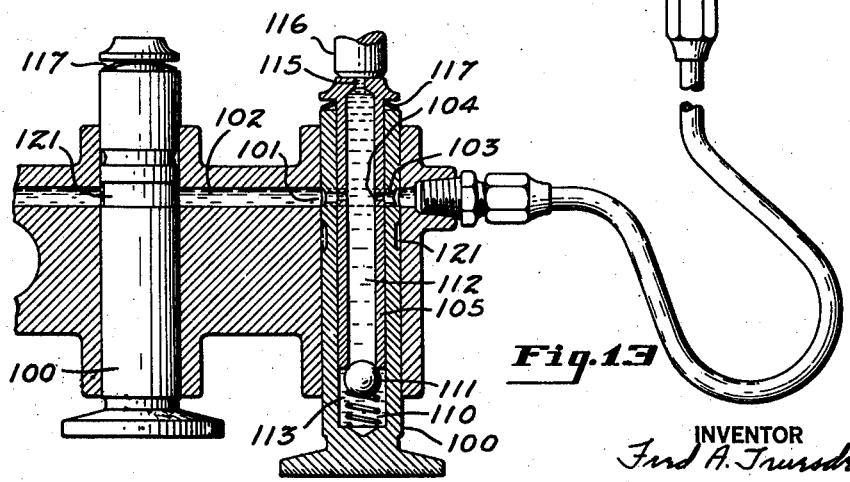

March 16, 1937. F. A. TRUESDELL 2,074,155
SELF ADJUSTING VALVE TAPPET
Filed Aug. 9, 1934  3 Sheets-Sheet 3

INVENTOR
Fred A. Truesdell
BY
Evans & McCoy
ATTORNEYS

Patented Mar. 16, 1937

2,074,155

UNITED STATES PATENT OFFICE 2,074,155

SELF-ADJUSTING VALVE TAPPET

Fred A. Truesdell, East Cleveland, Ohio

Application August 9, 1934, Serial No. 739,129

11 Claims. (Cl. 123—90)

This invention relates to valve tappets for actuating valves of the character used in internal combustion engines and other devices, and more particularly to self-adjusting valve tappets.

One of the objects of the invention is to provide a valve lifter or tappet having a self-loading hydraulic slack adjuster of such form as to compensate for wear of the parts between which the slack adjuster is interposed.

Another object of the invention is to provide a commercially practical hydraulic valve tappet that is relatively inexpensive to manufacture, of relatively few machined parts, and that is rugged and reliable in operation.

Several embodiments of my invention are shown in the accompanying drawings wherein, Figure 1 is a sectional elevational view of one embodiment of the invention;

Fig. 2 is a sectional view taken on the line 2—2 of Fig. 1;

Fig. 3 is an elevational view of the plunger for the mechanism shown in Fig. 1;

Fig. 4 is an elevational sectional view of a modified embodiment of the invention;

Fig. 5 is a view taken on line 5—5 of Fig. 4;

Fig. 6 is a cross sectional view taken on line 6—6 of Fig. 4;

Fig. 7 is an enlarged sectional view of the cam-engaging portion of the slack adjuster shown in Fig. 4;

Fig. 8 is an enlarged view of the central portion of the bottom of the assembled plunger of the device shown in Fig. 7;

Fig. 9 is an enlarged sectional view taken on lines 9—9 of Fig. 7, showing the central portion of the assembled plunger;

Fig. 10 is an elevational sectional view of a jig used for adapting a conventional Ford motor to the use of the slack adjuster shown in Fig. 4;

Fig. 11 is a perspective view of the jig shown in Fig. 10;

Fig. 12 is an elevational sectional view of a modified embodiment of the invention suitable for use with Chevrolet automobiles of current manufacture;

Fig. 13 is an elevational sectional view of a modified form of the invention, together with a sectional view of a controlled oil supply reservoir, including oil level regulating equipment;

Figure 14:
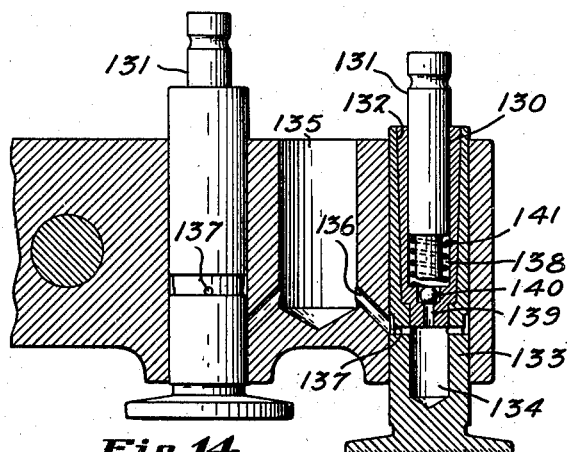
Fig. 14 is a sectional elevational view of a further modification of the slack adjuster with certain modifications later to be described.

The slack adjuster shown particularly in Figs. 1, 2 and 3 of the drawings is illustrated in its environment in connection with the guide member 1 of an internal combustion engine block for supporting the slack adjuster, the valve operating cam shaft 2 that carries cams 3 and 4 of conventional form, a conventional valve stem 5 having a suitable valve closing spring 6 and a spring seat 7 that is held in place on the valve stem 5 by means of a suitable pin 8, and the slack adjusting valve tappet 9 that is interposed between the cam 4 and the corresponding valve stem 5.

The guide member 1 of the engine block has an oil collecting pocket 32 of any suitable form that has a passage or oil duct 33 extending from adjacent the bottom thereof into open communication with the guide bore 1a of the guide member 1.

The self-adjusting hydraulic valve tappet assembly 9, that is shown in Figs. 1, 2 and 3 of the drawings, comprises a cast iron cam follower or valve shoe 15 that has an external cylindrical guide surface 9a of sufficient size to snugly fit within the guide bore 1a of the guide member 1 which forms a part of the engine block that carries the tappet. The shoe 15 preferably has a chilled cast iron cam follower surface 16.

The valve shoe 15 has an internal reamed bore or plunger bore 9b of uniform diameter from end to end that carries a close fitting plunger 17 that is slidably mounted in the plunger bore 9b of the shoe. The upper end 18 of the plunger 17 engages the valve stem 5 of the engine.

The valve shoe 15 has an external annular groove 30 formed in its outer cylindrical face 9a that provides an annular oil receiving reservoir between the close fitting shoe and the guide bore. When the valve shoe 15 is in its lowermost position the annular groove 30 registers with the oil passage 33 to receive oil from the passage 33. When the shoe 15 is lifted by the cam 4, the delivery opening of the passage 33 is closed by the close fit of the cylindrical face of the shoe in the bore 1a of the guide member, in order that the annular oil receiving reservoir formed by the groove 30 may receive oil from the duct 33 when the valve shoe is in its lowermost position, but not when the shoe is lifted by operation of the cam 4.

One or more inlet openings 31 extend through the side wall of the valve shoe, from the bottom portion of the annular groove 30 into open communication with an oil receiving chamber 15a formed between the plunger 17 and the bore of the valve shoe.

The plunger 17 has spaced piston portions 19 and 20 that are connected by a portion 21 of less diameter than the piston portions to form with the bore 9b of the shoe, the annular oil receiving chamber 15a. A passageway 22 extends from the oil receiving chamber 15a through the lowermost piston portion 20 of the plunger and opens into the oil pressure or cushioning chamber 15b that is defined by the bottom of the reamed bore 9b of the valve shoe and the piston 20 of the plunger 17.

The plunger 17 also has a projection 24 extending downwardly from the piston portion 20 and arranged to receive a surrounding helical spring 25 that is seated at its upper end on a suitable shoulder 26 that is formed on the plunger at the base of the projection 24 and that is also seated in the bottom of the reamed bore 9b of the valve shoe. The projection 24 serves as a stop for limiting movement of the plunger 17 into the bore of the shoe when the supply of oil is deficient.

Figure 16:
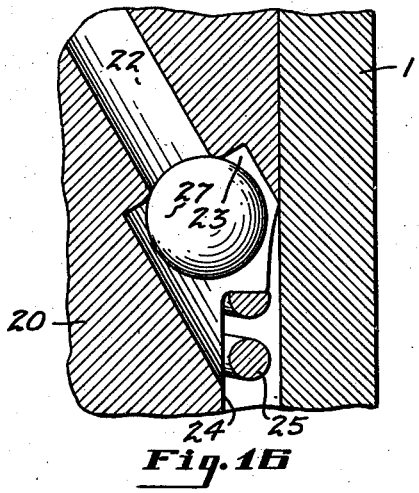
Fig. 16 is an enlarged view of the ball check valve embodied in the construction of the present invention, showing the valve in its closed position.

The lower end of the passageway 22 has a counterbore, indicated at 23, for receiving a suitable ball check valve 27 that serves as a check valve for permitting oil to flow downwardly into the lower pressure or cushioning chamber 15b of the device but prevents return flow of oil. This relation of the check valve and the supporting spring is particularly shown in Fig. 16. The ball check valve 27 fits closely within the counterbore 23 of the passageway 22 and forms a close seal with the passageway 22 when the ball check valve 27 is in its uppermost position as shown in Fig. 16. The ball check valve 27 is preferably about $\frac{1}{32}''$ less in diameter than the counterbore 23 for receiving the same and it is held in its position with respect to the counterbore 23 by the uppermost portion of the helical spring 25. The spring 25 not only serves to maintain the ball check valve 27 in close proximity to the valve seat formed at the juncture of the counterbore and the passageway 22, but also yieldingly urges the plunger 17 against the valve stem 5 that is controlled by the tappet 9.

The plunger supporting spring 25 that is carried by the lower projection 24 of the valve plunger is of preferably substantially 20 pounds pressure when closed, so that this spring will never overcome the valve closing spring 6 that is of substantially 90 pounds pressure when closed.

A suitable air escape port 34 extends through the wall of the valve shoe 15 at a sufficient elevation with respect to the annular oil receiving chamber 15a to permit the escape of any air that may be entrapped within the oil receiving chamber 15a and so positioned with respect to the top of the guide bore 1a of the engine block that when the tappet moves to its uppermost position as shown in the view of the tappet to the left in Fig. 1, such entrapped air will escape from the annular oil receiving chamber 15a and thereby be released from the oil receiving chamber. The position of this aperture is controlled by the particular character of tappet used and by the service demanded of it, so that there is only sufficient uncovering of the air escape port 34 to release the air from the annular oil receiving chamber 15a and prevent substantial throwing of oil from said opening or port 34 during operation of the tappet. The violent movement and rapid reciprocation of the tappet in its bore and the inertia of the oil would tend to throw oil from the port 34 and thereby deplete the supply of oil in the annular oil receiving chamber 15a unless the uncovering of the port 34 is a minimum for the function desired.

For certain applications it may be unnecessary to actually uncover the port 34 in the uppermost position of the valve tappet because the entrapped air may be permitted to escape sufficiently between the bore 1a of the guide member and the close fitting surface of the valve shoe.

In the operation of the self-adjusting tappet shown in Figs. 1 to 3 inclusive, the rotation of the cam shaft 2 and the compression of the valve spring 6 causes the valve shoe 15 to be raised and lowered during the operation of the engine to open and close the engine valves. The valve closing spring 6 carried by the engine valve stem 5 presses the valve stem 5 against the slack adjuster plunger 17 until the engine valve becomes completely seated.

The oil used in the internal combustion engine collects in the reservoir or pocket 32 of the support 1 and runs from there through the passage 33 into the annular oil receiving reservoir formed by the groove 30 and the bore 1a of the guide member and then through the inlet openings 31 into the oil receiving chamber 15a defined by the bore of the valve shoe 15, the stem portion 21 of the plunger 17 and the piston portions 19 and 20 of the plunger 17.

The annular oil receiving reservoir formed on the outside of the shoe by the groove 30 may be quite small because it serves to drain oil from the oil receiving pocket 32 of the engine block through the duct 33 to the oil receiving chamber 15a. The capacity of the oil receiving chamber 15a is greatly in excess of the oil pressure or cushioning chamber 15b in order that a large oversupply of oil will always be available for the hydraulic lift or cushioning chamber 15b. If there is a deficiency of oil in the chamber 15b when the engine is started because the tappet has been subjected to the pressure of the engine valve spring 6 for a long period of time or from other cause, the initial intake of oil to the cushioning chamber 15b will be quite rapid and it is essential that solid oil be received in this chamber in order that the engine valve may be fully opened by operation of the tappet. If air were received in the cushioning or pressure chamber 15b, it is difficult to remove and the air would be greatly compressed by operation of the cam 4 and the engine valve would be opened only partially with resulting inefficiency of the engine and burning of the engine valves.

In this manner the oil receiving chamber 15a of the slack adjuster is constantly charged with a sufficient quantity of oil to charge the pressure or cushioning chamber 15b formed between the piston portion 20 of the plunger and the lower end of the bore of the valve shoe to which it is admitted through the passageway 22 and past the ball check valve 27 into the hydraulic lift or cushioning chamber 15b.

Since the ball 27 fits its bore appreciably to substantially within $\frac{1}{32}''$ clearance, any clearance between the cam 4 and the lower end of the valve stem 5 will be taken up by the separational movement of the plunger 17 within the bore 9b of the shoe 15 by reason of the operation of the spring 25.

As the cam shaft 2 rotates, the cam 4 lifts the valve shoe, thereby exerting upward pressure on the slack adjusting device that is opposed by the spring 6 of the valve stem 5. With the initial upward pressure on the valve shoe, the ball valve 27 is immediately closed, which prevents the leakage of oil from the hydraulic pressure chamber of the valve back onto the oil receiving chamber 15a between the plunger and the valve shoe 15.

As the cam continues to lift the valve shoe it reaches the uppermost position of its stroke, as shown in the upper left-hand figure of the drawings, and for that position the air escape port 34 is uncovered sufficiently or brought sufficiently close to the top of the valve guide to permit any entrapped air within the oil receiving chamber 15a to escape without, however, permitting the discharge of a stream of oil from this aperture. In this position, the upward movement of the valve shoe closes the oil duct or passage 33. As the cam 4 continues its rotation, the cam permits the slack adjusting mechanism to drop, and this dropping of the slack adjuster is followed by the valve stem 5 by reason of the pressure of the valve spring 6 until the slack adjuster reaches the position shown in the right-hand view of Fig. 1. If there is then any clearance between the face of the cam and the lower end of the valve stem, the helical spring 25 tends to lift the plunger 17 out of the shoe. The close fit of the cylindrical piston portions 19 and 20 of the plunger within the valve shoe, and the relatively close fit of the ball valve 27 on its seat, and the very limited range of movement of the ball 27 from its seat, insure that the slack adjusting mechanism will at all times bear with very light pressure on the face of the cam 4 and the lower end of the valve stem 5, thereby compensating for any wear or clearance between these parts.

Furthermore, the air escapement port 34 is made sufficiently small and is maintained housed a sufficient degree by the top of the guide for the valve shoe to prevent the throwing of oil from this port.

It is to be understood that the valve stem is not necessarily of the chilled cast iron head type, but it may be made of any other suitable material for such parts.

It is also to be understood that the plunger 17 has a very close ground fit within the bore of the hollow shoe 15, so that oil is maintained within the hydraulic compression pocket of the slack adjuster.

Figs. 4 to 9, inclusive, show a modified form of a slack adjuster embodying the invention, particularly intended for use in a current model of the Ford automobile. In this embodiment of the invention an aperture 40 is formed through the upper wall of the journal for the valve lifter, this aperture performing the same function as the oil duct or passage 33 of Fig. 1. The valve lifter comprises a cup-shaped portion 41 that engages the face of the cam 42, operated from a conventional cam shaft 43. The cup-shaped member 41 has a suitable annular groove 44 formed on its outer face and in open communication with the interior of the cup-shaped member through suitable apertures 45. The annular groove 44 comes into registered relation with the aperture 40 at the lowermost position of the valve lifter member 41 so that the oil collected within the oil collecting pocket 46 of the motor block is fed through the apertures 45 into the interior of the cup-shaped member 41. A suitable plunger 47 that engages the valve stem 48 has a pair of piston portions 49 and 50 that are spaced apart and that are separated by an annular oil receiving chamber 51 that has the same functions as the oil receiving reservoir formed by the groove 30 of Fig. 2. The piston portion 50 of the slack adjuster has an opening or passageway 51a formed through its lower face to communicate with the oil receiving chamber 51 and the lift or cushioning chamber 67. The opening 51a is closed by a suitable ball 52 that is held in place by a wire clip 53 that is carried by a plunger projection 60, as shown in Fig. 9.

The lower end portion 60 of the plunger 47 has a drilled opening 62 extending transversely thereacross to receive the U-shaped stem 63 of the ball retaining member 53. The projecting portion 60 of the plunger 47 also has a groove 63a extending thereacross for the free access of the oil that passes the ball valve 52 to the cushioning chamber 67. The portion 60 of the plunger 47 seats on a suitable disk-shaped steel spring 65 that is carried in the bottom of the cup-shaped member 41 and which is of about 20 pounds pressure for tending to lift the valve plunger away from the bottom of the cup-shaped member 41.

The cup-shaped member 41 may be made from steel that is internally reamed out to provide a close fit for the plunger member. Separation of the device is prevented by a suitable spring lock ring 66 that is mounted in a conventional groove that is formed in the mouth portion of the cup-shaped member 41.

The operation of the valve lifter shown in Figs. 4 to 9, inclusive, is substantially the same as the valve lift mechanism shown in Fig. 1. When the valve is seated and the shoe 41 is riding on the corresponding low portion of the cam 42, the disk spring 65 pushes the valve plunger against the engaging end of the valve stem 48 and it also pushes the valve engaging shoe portion of the cup-shaped member 41 into seated engagement with the cam surface 42. Since the oil receiving chamber 51 defined by the cup-shaped member 41 and the pistons 49 and 50 of the plunger 47 is always charged with oil from the passage 40 and the reservoir pocket 46 of the motor block, any permitted movement between these parts causes oil to flow form the oil chamber 51 through the ball check valve 52 into the hydraulic lift or cushioning chamber 67 of the unit. As pressure from the cam increases in its effort to lift the valve 48 from its seat, the pressure on the oil in the hydraulic lift reservoir 67 increases, closes the valve 52, and from then on there is no movement between the valve plunger 47 and the cup-shaped member 41, and the two move together to lift the valve.

On the return movement of the slack adjuster the pressure of the valve spring holds the valve stem against the plunger 47 and the cup-shaped member 41 against the cam, so that no separational movement of the plunger and the cup-shaped member can occur during this period of the cycle, the only oil charging movement for the plunger occurring during the interval of complete closure of the valve, so that pressure from the spring of the valve is removed from the plunger, thereby permitting the plunger lifting spring 65 to operate to recharge the hydraulic pressure chamber of the slack adjusting unit in the event that any oil has leaked from it.

One or more small drill holes 69 that are positioned below the upper piston member of the plunger 47, and in such position that it will be uncovered or opened sufficiently at the upper end of the stroke as to release entrapped air from the chamber 51, is provided through a side wall of the cup-shaped shoe member 41.

It is found in practice that this recharging of the pressure reservoir occurs during the time of the first rotation of the motor shaft by the starter and that by the time the engine is in operation the slack adjuster is completely charged with oil so that no slack occurs during the operation of the engine. With a very close working fit of these parts the oil leaks from the hydraulic chamber of the valve lifter only at an extremely slow rate, even when the valve is left in its uppermost position, as shown in Fig. 1, it requiring many hours to discharge the oil from the hydraulic chamber of the device, and because of the limited capacity of this chamber and because of the operation of the plunger lifting spring between the bottom of the shoe and the plunger, the recharge of oil for the hydraulic cylinder occurs almost instantly when the engine is started into operation.

In order to equip a current model of Ford car with an adjuster of the type shown in Figs. 5 to 9 inclusive, a suitable jig 70 as shown in Figs. 10 and 11 may be used to assist in drilling the passage 40 through the side wall of the journal for the tappet after the old tappet is removed and prevent the drill chips from dropping into the lower part of the motor. The drill jig 70 has a stem portion 71 that closely fits the port of the tappet guide of the motor block. The drill jig 70 also has an overhanging guide lip 72 provided with an opening 72a that properly locates the drill (not shown) with respect to the side wall portion 73 of the tappet guide and the jig also has an aperture 74 that is alined with the opening 72a to permit any chips that are carried through by the drill to be collected within the hollow interior pocket 75 of the drill jig 70.

By the use of such a jig the proper location of the oil supply passage 40 can be formed in any Ford block in a very few minutes by the use of conventional drilling equipment. Other drill chips that collect on the face 46 of the motor block are readily removed and do no damage, whereas if chips were permitted to enter the interior of the motor block over the cam shaft they would do considerable harm.

Fig. 11 is an external elevational view, shown partially in perspective, of the drill jig 70 shown in Fig. 10.

Fig. 12 shows a modification of the form of slack adjuster illustrated in Figs. 4 to 9 inclusive, that is adapted for use with a Chevrolet car of conventional manufacture. For this form of slack adjuster the valve stem 76 is seated in a suitable socket that is formed in the slack adjuster or plunger 77a. The shoe 78 of the slack adjuster has substantially the same fit with the motor frame as is given to valve tappets conventionally used in this particular automobile.

For this modification of the invention the cup-shaped shoe member 78 has an annular groove 79 formed around its outside wall in registered relation with the oil inlet passage 80 that opens into the space between the motor block 81 and the tappet cover plate 82 of the car.

Oil is admitted to the oil receiving chamber 83, as defined by the pistons of the plunger and the bore of the shoe member 78, and the annular oil receiving groove 79 through a series of suitable inlet openings or apertures 84 extending from the bottom of the groove 79 to the interior of the shoe 78. Oil is admitted from the reservoir 83 to the hydraulic lift or cushioning chamber 85 by means of suitable intersecting drill holes 86 and 87, a suitable ball 88 that fits an enlarged portion of the drill hole 87, serving to prevent return flow of oil through the drill hole 87. The ball 88 is held in place by the same character of spring clip that is shown in detail in Figs. 4, 7, 8 and 9.

A suitable spring ring 90 prevents disassembly of the cup-shaped shoe member 78 and its associated plunger 77. An aperture 92 that almost reaches the top wall of the upper face of the motor block when the valve is in its uppermost position permits escape of entrapped air from the oil receiving chamber 83 during operation of the device.

The valve structure shown in Fig. 13, that is particularly adapted for use in a Chrysler car of current model, has a chilled cast iron head shoe member 100 that is provided with an annular groove 101 in its outer face that forms an oil receiving reservoir and that registers with a suitable oil supply duct or channel 102 that is provided in the motor block by a straight drilling through the tappet guide bores. Suitable drill holes 103 extend through the sleeve of the shoe member 100 and register with suitable drill holes 104 that are formed in the hollow sleeve-like plunger 105 of the slack adjuster, thereby permitting oil to enter the hollow stem of the slack adjuster from a suitable reservoir 105a, that carries a supply of oil that is regulated by any suitable means, such as the float member 106, the supply of oil being provided by pressure from the engine oiling system through the oil inlet port 107.

The valve shoe has a reamed bore 112 extending substantially its entire length, that provides a socket at its lower end for receiving a suitable spring 110 that is only of 2 or 3 ounces pressure when closed, and that supports a suitable ball valve 111. The ball valve 111 closes the lower end of the tubular plunger 105 of the slack adjuster, so that a valve-closed hydraulic chamber 113 is formed between the ball-closed end of the plunger 105 and the bottom of the bore in the chilled faced shoe 100. The upper end of the plunger 105 has a drilled opening 115 therein that permits the escape of air from the plunger to the atmosphere from time to time. This opening 115 is normally closed by the seating against the valve plunger 105 of the lower end of the valve stem 116, so that oil is not permitted to be thrown from the hollow stem out into the motor block.

A suitable annular disk spring 117 of about 20 pounds closed pressure is interposed between the flanged upper end of the plunger 112 and the upper end of the shoe 100 to tend to withdraw the plunger 112 from the bore of the shoe 100.

In the operation of the device shown in Fig. 13 oil under pressure is delivered from the reservoir 105a to the annular groove 101 of the shoe and the drilled openings 103 and through the apertures 104 to the hollow stem of the valve plunger 105. When the plunger reaches its uppermost position, as shown in the lefthand view of Fig. 13, the groove 121 in the outer face of the shoe permits the supply of oil under pressure from the reservoir 105a to flow past the first valve lift unit to the second valve lift unit. These grooves in the outer face of the valve shoes are so positioned with respect to the positions of succeeding valve units that for at least one interval during the cycle oil will be supplied under pressure through the entire system, thereby charging each unit with oil under pressure.

As an alternative, the supply to the grooves 101 of the valve shoe may be obtained from a single oil header that is drilled through to some such position as the oil supply line.

Fig. 14 of the drawings shows a modified form of the invention in which a die cast, replaceable sleeve 130 is used to provide a suitable bearing face for the plunger 131. The die cast sleeve 130 has an external tapered surface 132 that permits its close fit within a correspondingly tapered socket formed in the upper end of the valve shoe 133. In this particular embodiment of the invention the oil reservoir 134 for the supply of oil to the hydraulic pressure chamber of the slack adjuster is provided below the pressure chamber rather than above the pressure chamber, as in the modifications heretofore shown.

In this adaptation of the invention an oil pocket 135 formed in the motor frame has suitable drain openings 136 that extend to and register with an annular groove 137 that is formed around the outer surface of the valve shoe 133. Oil is admitted to the internal reservoir pocket 138 of the valve shoe by suitable drilled openings 139. The bottom of the die cast sleeve 130 opens into the reservoir 138, and this opening is closed by a close fitting ball valve 140. A suitable plunger lift spring 141 is seated on a suitable shoulder of the plunger 131 and a corresponding shoulder of the sleeve 130 to tend to move the plunger 131 out of the socket in the die cast sleeve 130.

Figure 15:
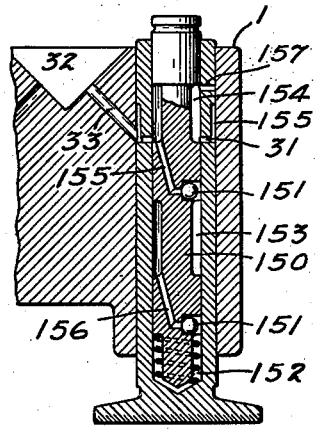
Fig. 15 is a sectional elevational view of a slack adjuster designed for use under more rigorous conditions than the slack adjuster illustrated in Fig. 1, and embodying many of the features of Fig. 1.

Fig. 15 shows a valve of the general character of that shown in Fig. 1 for use under severe operating conditions, such as in connection with very high speed engines, or where a more refined valve lift unit is desired. In this form of valve unit the parts numbered correspondingly with those parts in Fig. 1 are of the same general character. The major differences are that, instead of one oil reservoir unit formed by suitable annular grooves around the outside of the valve plunger 150, two such reservoirs are provided and two suitable ball valves 151 are provided to prevent the escape of oil from the hydraulic pressure chamber 152 into either of the reservoirs 153 or 154. In this modification of the invention the lift shoe has an annular groove 155 formed around its outer face in registry with the delivery passage 33 that leads from the oil collection reservoir 32, and this oil is delivered to the inside of the shoe through suitable drill openings 31. Oil from the uppermost reservoir 154 is delivered through a suitable drill opening 155 and past the upper ball valve 151 to the reservoir 153. From the reservoir 153 oil may be sucked through the drill opening 156, past the lower ball valve 151, into the hydraulic pressure chamber 152. Each of the ball valves 151 closely fits the seat that is formed by drilling at right angles with the axis of the valve with the side of the plunger. Only slight movement of the ball is permitted because of the close clearance between the ball and the side wall of the shoe.

As in the former adaptations of the invention, a suitable air-escape port 157 is provided for permitting release of entrapped air from the uppermost oil receiving chamber 154 when the valve is in its uppermost position.

Each of the valve slack adjusters shown and described heretofore has a pressure chamber from which oil is not permitted to escape during the initial movement of the valve lifter. The charging of the slack adjuster occurs once for any continuous operation of the engine, and thereby distinguishes from a great number of such apparatus as have heretofore been devised, in which the new oil is necessary for each movement of the valve, thereby decreasing the lift that is obtained on the valve, leaving some clearance between slack adjuster and the valve for each operation.

From the foregoing description it will be apparent that any suitable depression or pocket in the engine block may be employed for receiving and retaining oil that is thrown around inside of the engine by operation of the engine. The capacity of this oil collecting reservoir in the engine block adjacent the tappet guide is made sufficiently large to retain an adequate quantity of oil at all times and the oil flows into the oil receiving chamber of the tappet when the tappet assembly is in its lowermost position, whereas the oil receiving chamber of the tappet is sealed from the oil collecting reservoir of the engine block when the tappet is in its lifted position in order that the oil will not be thrown free from the oil receiving chamber of the tappet by reason of the violent movement of the tappet in performing its duties.

In the construction shown in Figs. 4 to 9, inclusive, the oil collecting reservoir 46 of the engine block is formed in the tappet guide portion of the block. The oil inlet passage 40 receives its supply of oil from the reservoir 46 of the engine block and delivers the oil through the inlet openings 44 that are formed through the side wall of the externally grooved portion of the valve shoe 41 in order to maintain an adequate supply of oil within the oil receiving chamber 51 of the tappet that corresponds in function to the oil receiving chamber 15a of the tappet assembly shown in Fig. 1 and heretofore described.

In the modification shown in Fig. 12 the oil collecting reservoir of the engine block is formed by the valve cover plate 82 of the motor and the associated parts of the engine block and the oil passage 80 delivers oil from this oil collecting reservoir through the inlet openings 84 that are formed in the bottom of the annular groove 79 that surrounds the external face of the valve shoe 78 to the oil receiving chamber 83 of the tappet.

In the modification shown in Fig. 14 the oil collecting reservoir 135 of the engine block collects and delivers the oil through the passage 136 and the inlet openings 137 of the valve shoe to the oil receiving chamber 134 of this form of tappet. A deep form of oil receiving well 135 is provided in the engine block in this instance to insure that air will not enter the tappet assembly and the tappet assembly is carefully charged with oil that is substantially free from air when the tappet is initially mounted in the engine. After the tappet is once in operation there is no danger of having oil enter the tappet assembly because of the depth of the well 135.

In the form of the invention shown in Fig. 15 the tappet plunger is constructed to provide two oil receiving chambers 153 and 154. The oil delivery passage 33 of the engine block maintains a supply of oil for the upper oil receiving chamber 154 and the oil that is delivered to the chamber 154 flows through the passageway 155 and the check valve 151 into the lower oil receiving reservoir 153 and then through the passageway 156 and the check valve 151 into the hydraulic lift or oil cushioning chamber 152. By forming a pair of spaced oil receiving chambers 153 and 154 and a suitable air escape port 157 in this construction it is insured that the oil that enters the oil receiving chamber 153 will be substantially free from air and that if any air does enter the chamber 153 it may escape through the check valve 151 into the upper reservoir and be released from the system through the air escape port 157 upon operation of the engine. When the tappet is in its lowermost position and the clearance between the valve stem and the face of the cam has been compensated for by movement of the plunger, the check valve 151 between the cushioning chamber 152 and the oil receiving chamber 153 will drop away from its seat and permit any air from the cushioning chamber to rise through the oil receiving chamber 153, and through the check valve 151 to the top of the oil receiving chamber 154. Air in this chamber is released through the air escape port 157 as heretofore described.

In the construction shown in Figures 1 to 3 provision is made for preventing complete separational movement of the plunger and shoe. This is provided for by the ball check valve 27 which, by reason of the inclined opening 23, allows the check valve, when the plunger 17 is lifted vertically, to engage the plunger bore with a wedging action of sufficient magnitude to prevent inadvertent separation of the shoe and plunger, as long as the tappet is in an upright position.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The combination with a guide member having a guide bore and an oil passage communicating with said bore, of a self-adjusting hydraulic tappet comprising a valve shoe having a plunger bore open at one end only, a plunger slidably mounted in said plunger bore, said shoe being reciprocably mounted in said guide bore, said shoe having an annular oil receiving reservoir arranged to register with said oil passage at predetermined positions of said shoe with respect to said guide bore, said reservoir opening into said plunger bore, said plunger having an oil chamber in communication with the opening of said reservoir into said plunger bore and a passageway opening into said oil chamber and into the space between the end of said plunger and the closed end of said plunger bore, said passageway having a counterbore at the end of said plunger to provide a valve seat, a check valve in said counterbore, said plunger having a portion of reduced diameter at its end adjacent to the closed end of said plunger bore, a helical spring surrounding said last mentioned portion and engaging the bottom of said plunger bore and the adjacent end of said plunger, said spring also holding said valve in close proximity to said valve seat; and means for permitting the escape of air from said oil chamber.

2. The combination with a guide member having a guide bore and an oil passage communicating with said bore, of a self-adjusting hydraulic tappet comprising a valve shoe having a plunger bore open at one end only, a plunger slidably mounted in said plunger bore, said shoe being reciprocably mounted in said guide bore, said shoe having an annular oil receiving reservoir arranged to register with said oil passage at predetermined positions of said shoe with respect to said guide bore, said reservoir opening into said plunger bore, said plunger having an oil chamber in communication with the opening of said reservoir into said plunger bore and a passageway opening into said oil chamber and into the space between the end of said plunger and the closed end of said plunger bore, said passageway having a counterbore at the end of said plunger to provide a valve seat, a check valve in said counterbore, means for retaining said valve in close proximity to said valve seat, a convexly shaped spring metal member interposed between the end of said plunger and the bottom of said plunger bore, and means for permitting the escape of air from said oil chamber.

3. The combination with a guide member having a guide bore and an oil passage communicating with said bore, of a self-adjusting hydraulic tappet comprising a valve shoe having a plunger bore open at one end only, a plunger slidably mounted in said plunger bore, said shoe being reciprocably mounted in said guide bore, said shoe having removable means for preventing complete separation of said plunger and shoe and having an annular oil receiving reservoir arranged to register with said oil passage at predetermined positions of said shoe with respect to said guide bore, said reservoir opening into said plunger bore, said plunger having an oil chamber in communication with the opening of said reservoir into said plunger bore and a passageway opening into said oil chamber and into the space between the end of said plunger and the closed end of said plunger bore, said passageway having a counterbore at the end of said plunger to provide a valve seat, a check valve in said counterbore, means for retaining said valve in close proximity to said valve seat, and means for permitting the escape of air from said oil chamber.

4. The combination with a guide member having a guide bore and an oil passage communicating with said bore, of a self-adjusting hydraulic tappet comprising a valve shoe having a plunger bore open at one end only, a plunger slidably mounted in said plunger bore, said shoe being reciprocably mounted in said guide bore, said shoe having an annular oil receiving reservoir arranged to register with said oil passage at predetermined positions of said shoe with respect to said guide bore, said reservoir opening into said plunger bore, said plunger having an oil chamber in communication with the opening of said reservoir into said plunger bore and a passageway opening into said oil chamber and into the space between the end of said plunger and the closed end of said plunger bore, said passageway having a counterbore at the end of said plunger to provide a valve seat, a check valve in said counterbore, means comprising a snap spring carried at the end of said plunger for maintaining said valve in close proximity to said valve seat, and means for permitting the escape of air from said oil chamber.

5. The combination with a guide member having a guide bore and an oil passage communicating with said bore, of a self-adjusting hydraulic tappet comprising a valve shoe having a plunger bore open at one end only, a plunger slidably mounted in said plunger bore, said shoe being reciprocably mounted in said guide bore, said shoe having an annular oil receiving reservoir arranged to register with said oil passage at predetermined positions of said shoe with respect to said guide bore, said reservoir opening into said plunger bore, said plunger having two spaced oil chambers, one of which communicates with the opening of said reservoir into said plunger bore and the other of which communicates with the space between the bottom of said bore and the adjacent end of said plunger, said last communication including a passageway opening through said plunger, a check valve for said passageway, said plunger having an opening extending between said chambers, a check valve for said last mentioned opening, a spring disposed between the bottom of said plunger bore and the adjacent end of said plunger, and means for permitting the escape of air from said chambers.

6. The combination with a guide member having a guide bore and an oil passage communicating with said bore, of a self-adjusting hydraulic tappet comprising a valve shoe reciprocably mounted in said bore and having a plunger bore open at one end only, a plunger slidably mounted in said plunger bore, spring means intermediate the bottom of said plunger bore and a portion of said plunger resiliently urging said plunger away from the bottom of said plunger bore, said portion of said plunger and the bottom of said bore forming an oil cushioning chamber, said plunger having a portion of reduced cross-sectional area intermediate its ends forming with said bore an oil receiving chamber of greater capacity than said cushioning chamber, an oil passageway in said plunger communicating with said oil receiving and cushioning chambers and having a valve seat at its region of communication with said cushioning chamber, and a valve associated with said seat, said valve shoe having an external circumferential oil reservoir intermediate its ends arranged to communicate at times with said oil passage and opening into said receiving chamber, the communication between said oil passage and reservoir being closed by said shoe except at the position of minimum thrust on said shoe, said shoe having an opening therein communicating at all times with said oil receiving chamber and being opened by the shoe to permit the escape of entrapped air from said oil receiving chamber only at a predetermined position of said shoe relative to said guide member and independently of said oil passage and the sliding connections of said shoe with said plunger and guide member.

7. The combination with a guide member having a guide bore and an oil passage communicating with said bore, of a self-adjusting hydraulic tappet comprising a valve shoe reciprocably mounted in said bore and having a plunger bore open at one end only, a plunger slidably mounted in said plunger bore, spring means intermediate the bottom of said plunger bore and a portion of said plunger resiliently urging said plunger away from the bottom of said plunger bore, said portion of said plunger and the bottom of said bore forming an oil cushioning chamber, said plunger having a portion of reduced cross-sectional area intermediate its ends forming with said bore an oil receiving chamber of greater capacity than said cushioning chamber, an oil passageway in said plunger communicating with said oil receiving and cushioning chambers and having a valve seat at its region of communication with said cushioning chamber, and a valve associated with said seat, said valve having a limited floating movement with respect to said seat, said valve shoe having an external circumferential oil reservoir intermediate its ends arranged to communicate at times with said oil passage and opening into said receiving chamber, the communication between said oil passage and reservoir being closed by said shoe except at the position of minimum thrust on said shoe, said shoe having an opening therein communicating at all times with said oil receiving chamber and being opened by the shoe to permit the escape of entrapped air from said oil receiving chamber only at a predetermined position of said shoe relative to said guide member and independently of said oil passage and the sliding connections of said shoe with said plunger and guide member.

8. The combination with a guide member having a guide bore and an oil passage communicating with said bore, of a self-adjusting hydraulic tappet comprising a valve shoe reciprocably mounted in said bore and having a plunger bore open at one end only, a plunger slidably mounted in said plunger bore, spring means intermediate the bottom of said plunger bore and a portion of said plunger resiliently urging said plunger away from the bottom of said plunger bore, said portion of said plunger and the bottom of said bore forming an oil cushioning chamber, said plunger having a portion of reduced cross-sectional area intermediate its ends forming with said bore an oil receiving chamber of greater capacity than said cushioning chamber, an oil passageway in said plunger communicating with said oil receiving and cushioning chambers, and having a valve seat at its region of communication with said cushioning chamber, and a valve associated with said seat, said valve having a limited floating movement with respect to said seat, said spring means predetermining the position of said valve most remote from said seat, said valve shoe having an external circumferential oil reservoir intermediate its ends arranged to communicate at times with said oil passage and opening into said receiving chamber, the communication between said oil passage and reservoir being closed by said shoe except at the position of minimum thrust on said shoe, said shoe having an opening therein communicating at all times with said oil receiving chamber and being opened by the shoe to permit the escape of entrapped air from said oil receiving chamber only at a predetermined position of said shoe relative to said guide member and independently of said oil passage and the sliding connections of said shoe with said plunger and guide member.

9. The combination with a guide member having a guide bore and an oil passage communicating with said bore, of a self-adjusting hydraulic tappet comprising a valve shoe reciprocably mounted in said bore and having a plunger bore open at one end only, a plunger slidably mounted in said plunger bore, spring means intermediate the bottom of said plunger bore and a portion of said plunger resiliently urging said plunger away from the bottom of said plunger bore, said portion of said plunger and the bottom of said bore forming an oil cushioning chamber, said plunger having a portion of reduced cross-sectional area intermediate its ends forming with said bore an oil receiving chamber of greater capacity than said cushioning chamber, an oil passageway in said plunger communicating with said oil receiving and cushioning chambers, said passageway extending diagonally through said plunger and being enlarged at the region of communication with said cushioning chamber to form a valve seat, and a valve associated with said seat, said valve shoe having an external circumferential oil reservoir intermediate its ends arranged to communicate at times with said oil passage and opening into said receiving chamber, the communication between said oil passage and reservoir being closed by said shoe except at the position of minimum thrust on said shoe, said shoe having an opening therein communicating at all times with said oil receiving chamber and being opened by the shoe to permit the escape of entrapped air from said oil receiving chamber only at a predetermined position of said shoe relative to said guide member and independently of said oil passage and the sliding connections of said shoe with said plunger and guide member.

10. The combination with a guide member having a guide bore and an oil passage communicating with said bore, of a self-adjusting hydraulic tappet comprising a valve shoe reciprocably mounted in said bore and having a plunger bore open at one end only, a plunger slidably mounted in said plunger bore, spring means intermediate the bottom of said plunger bore and a portion of said plunger resiliently urging said plunger away from the bottom of said plunger bore, said portion of said plunger and the bottom of said bore forming an oil cushioning chamber, said plunger having a portion of reduced cross-sectional area intermediate its ends forming with said bore an oil receiving chamber of greater capacity than said cushioning chamber, an oil passageway in said plunger communicating with said oil receiving and cushioning chambers, said passageway extending diagonally through said plunger and being enlarged at the region of communication with said cushioning chamber to form a valve seat, and a valve associated with said seat, said valve having a limited floating movement with respect to said seat, said valve shoe having an external circumferential oil reservoir intermediate its ends arranged to communicate at times with said oil passage and opening into said receiving chamber, the communication between said oil passage and reservoir being closed by said shoe except at the position of minimum thrust on said shoe, said shoe having an opening therein communicating at all times with said oil receiving chamber and being opened by the shoe to permit the escape of entrapped air from said oil receiving chamber only at a predetermined position of said shoe relative to said guide member and independently of said oil passage and the sliding connections of said shoe with said plunger and guide member.

11. The combination with a guide member having a guide bore and an oil passage communicating with said bore, of a self-adjusting hydraulic tappet comprising a valve shoe reciprocably mounted in said bore and having a plunger bore open at one end only, a plunger slidably mounted in said plunger bore, spring means intermediate the bottom of said plunger bore and a portion of said plunger resiliently urging said plunger away from the bottom of said plunger bore, said portion of said plunger and the bottom of said bore forming an oil cushioning chamber, said plunger having a portion of reduced cross-sectional area intermediate its ends forming with said bore an oil receiving chamber of greater capacity than said cushioning chamber, an oil passageway in said plunger communicating with said oil receiving and cushioning chambers, said passageway extending diagonally through said plunger and being enlarged at the region of communication with said cushioning chamber to form a valve seat, and having a valve associated with said seat, said valve having a limited floating movement with respect to said seat, said spring means predetermining the position of said valve most remote from said seat, said valve shoe having an external circumferential oil reservoir intermediate its ends arranged to communicate at times with said oil passage and opening into said receiving chamber, the communication between said oil passage and reservoir being closed by said shoe except at the position of minimum thrust on said shoe, said shoe having an opening therein communicating at all times with said oil receiving chamber and being opened by the shoe to permit the escape of entrapped air from said oil receiving chamber only at a predetermined position of said shoe relative to said guide member and independently of said oil passage and the sliding connections of said shoe with said plunger and guide member.

FRED A. TRUESDELL.